Figure 1:
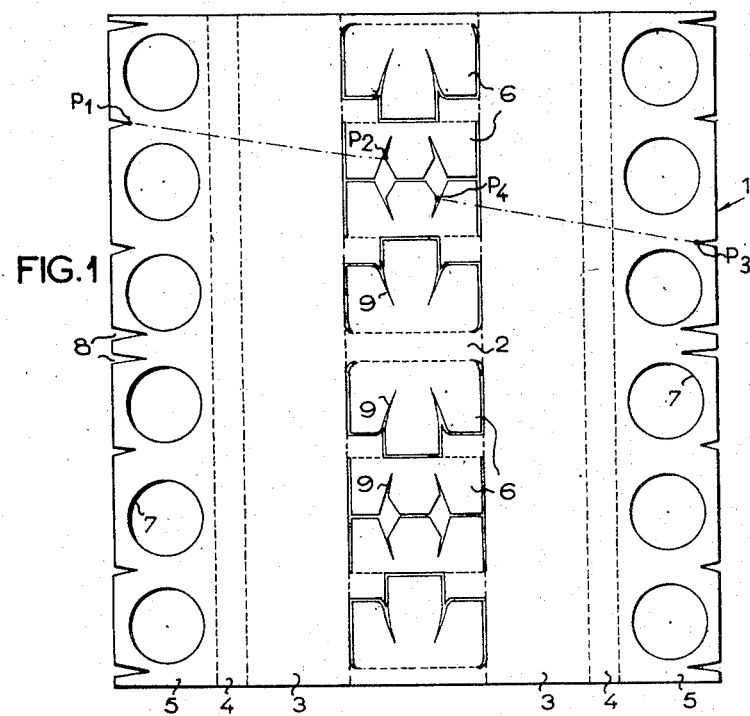

Aug. 27, 1957   C. PATIN   2,803,933
INSTALLATION FOR FORMING HOLDERS FOR EGGS OR THE LIKE
Filed May 28, 1956   15 Sheets-Sheet 1

Inventor
C. Patin
By Glascock Downing Seebold
Attys.

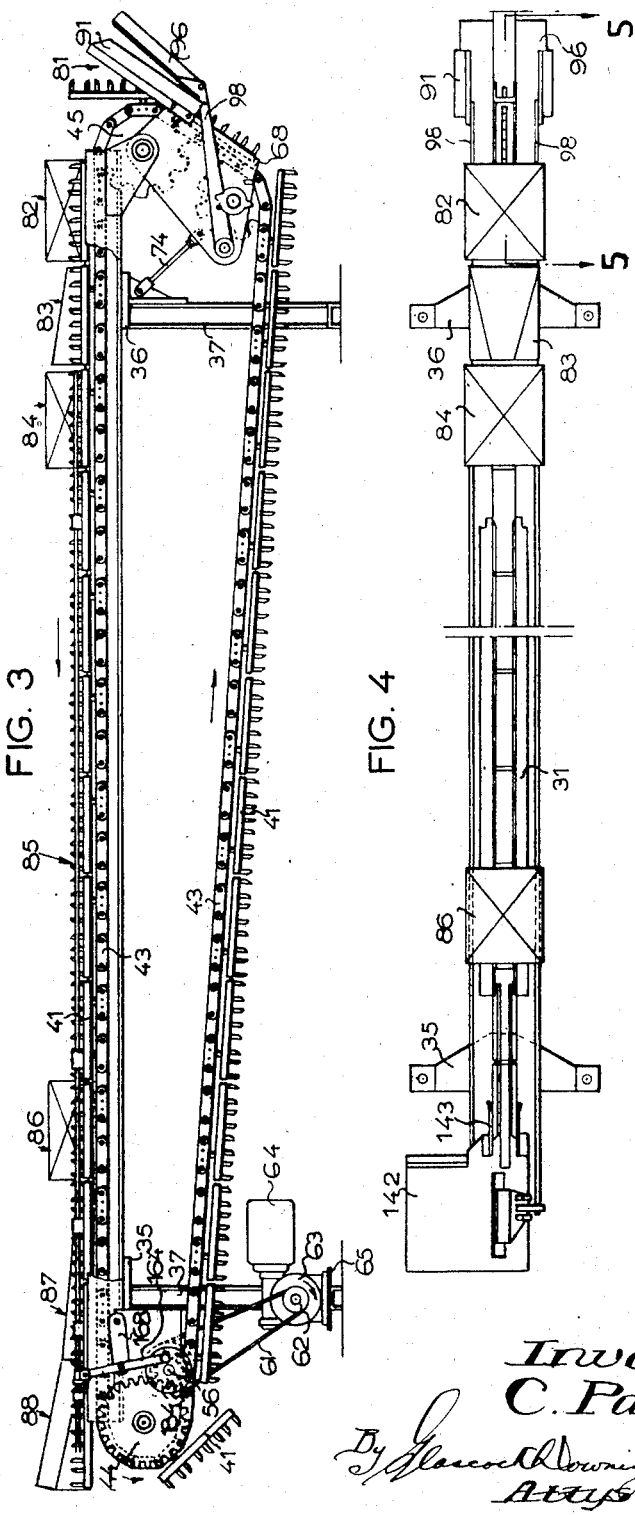

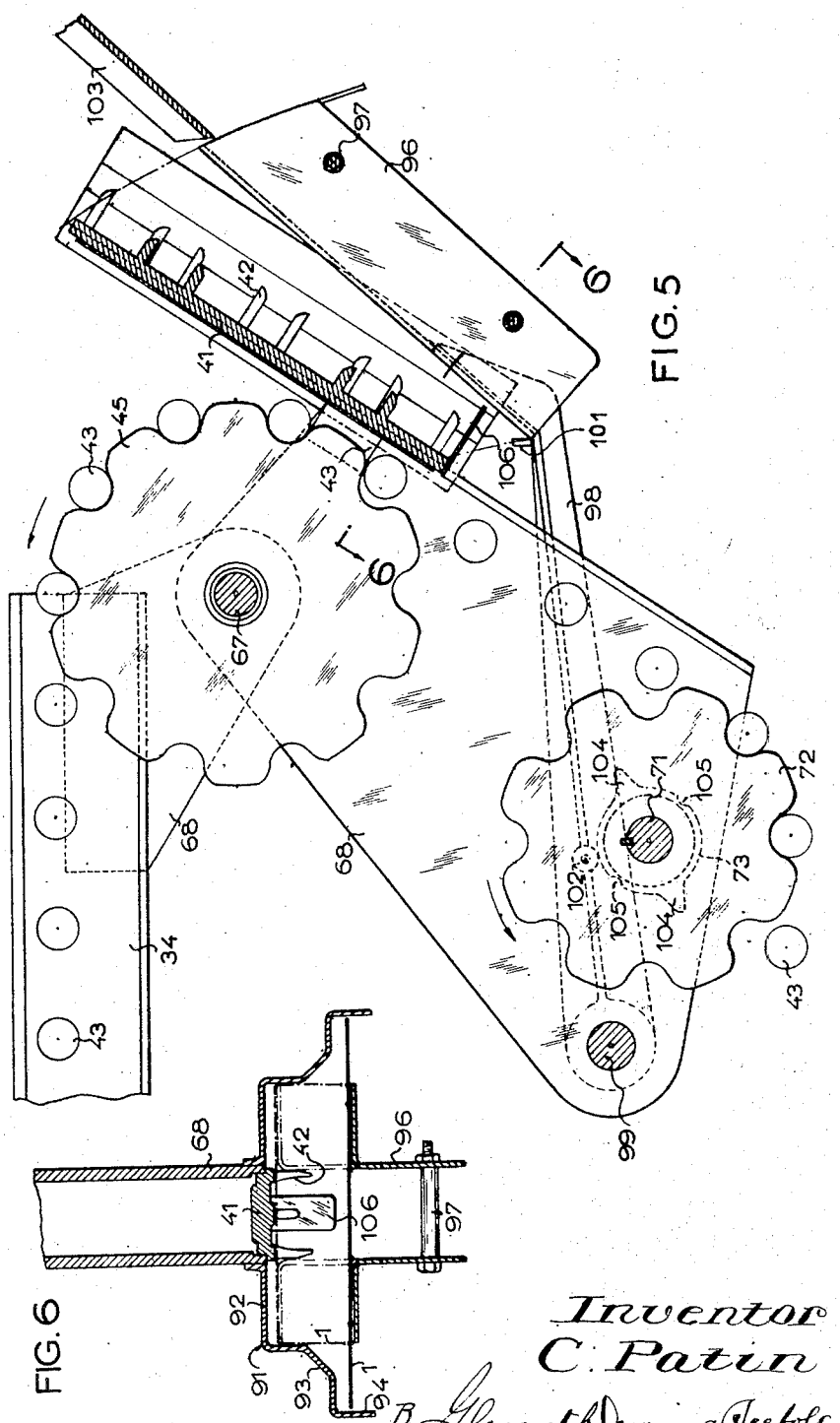

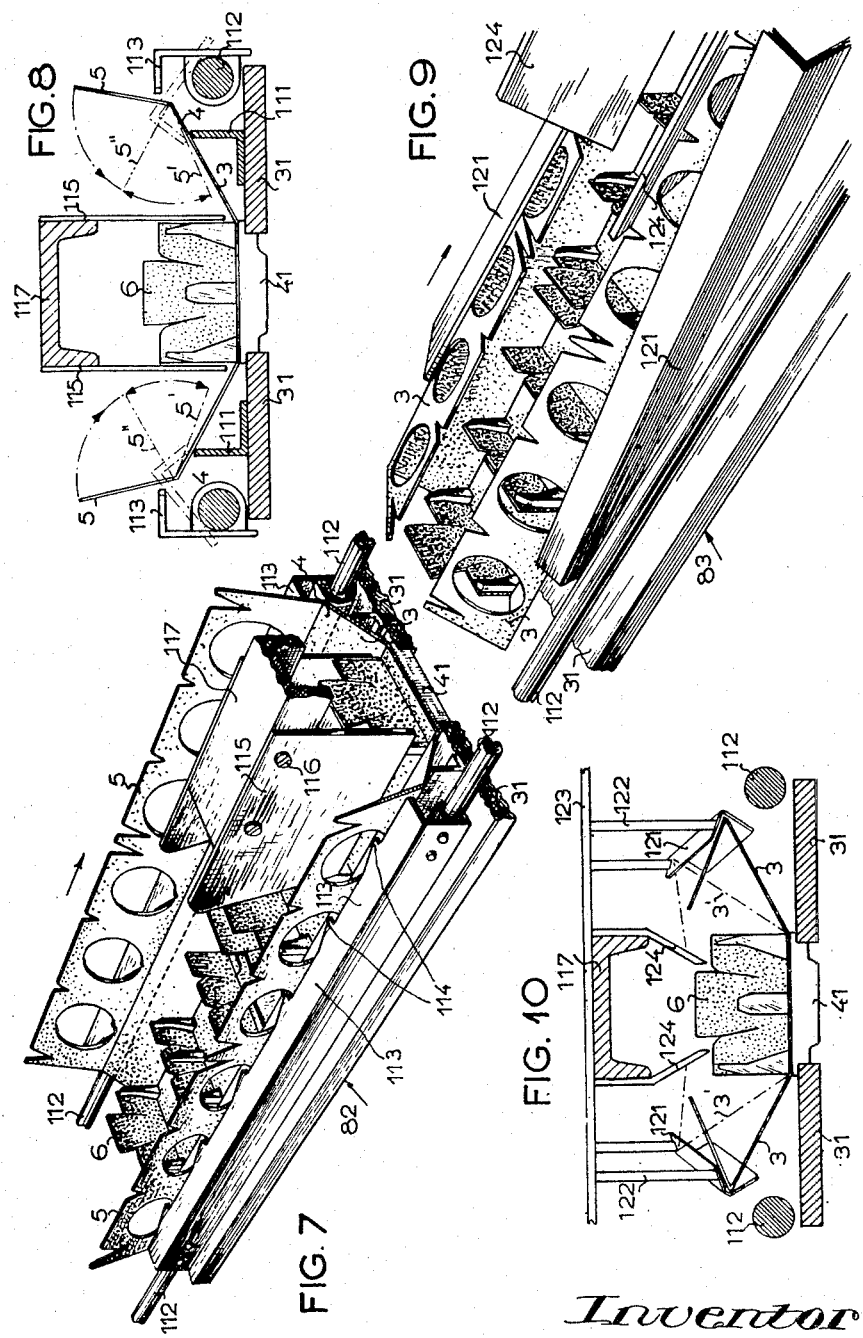

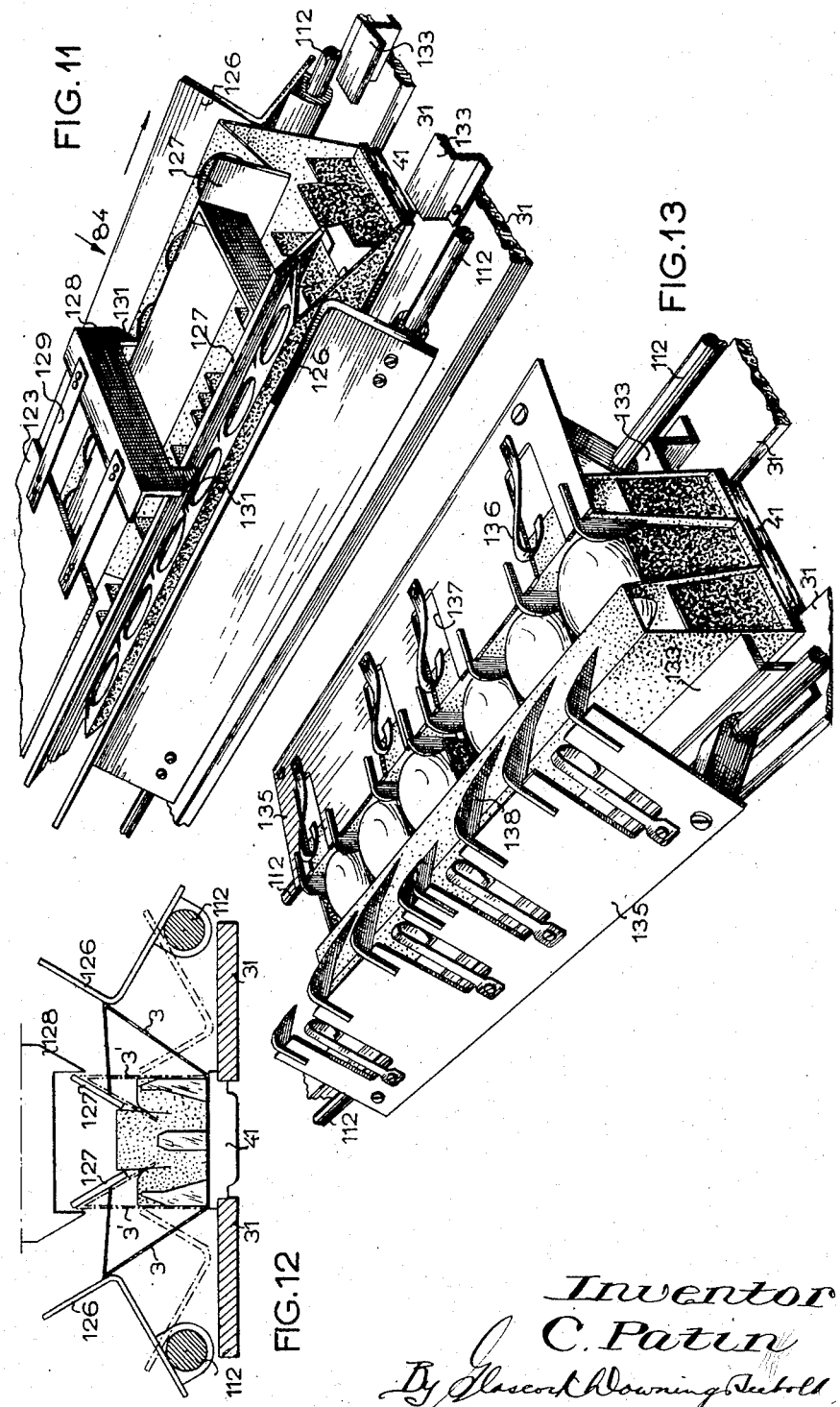

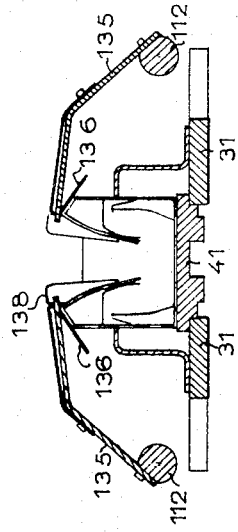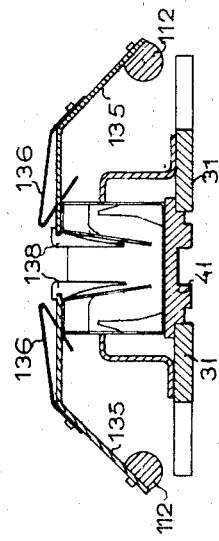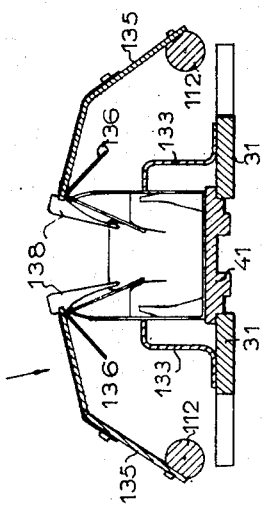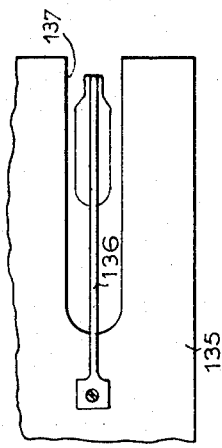

Aug. 27, 1957  C. PATIN  2,803,933
INSTALLATION FOR FORMING HOLDERS FOR EGGS OR THE LIKE
Filed May 28, 1956  15 Sheets-Sheet 7
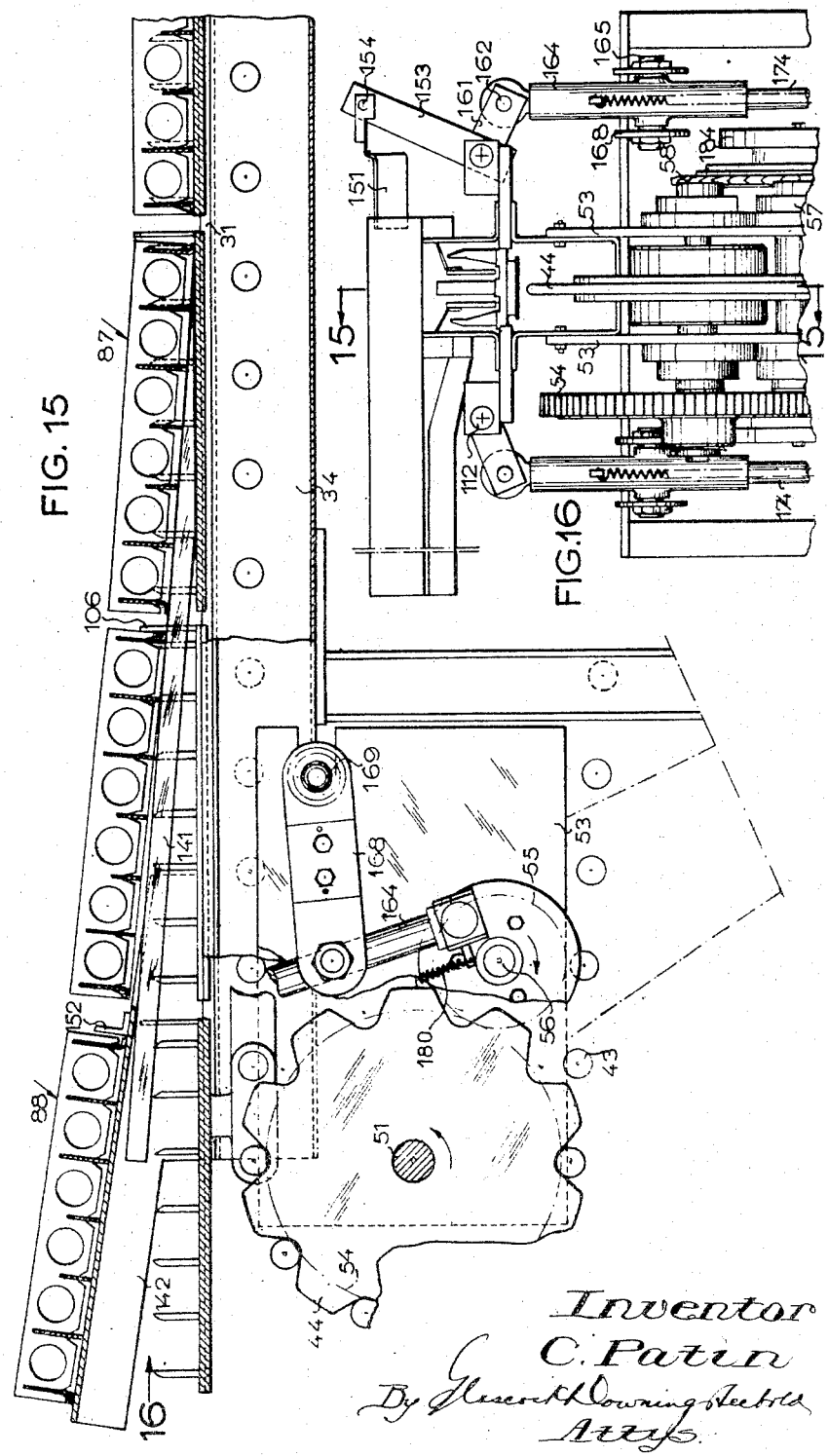
Inventor
C. Patin
By Hescock Downing Seebold
Attys.

Aug. 27, 1957 C. PATIN 2,803,933
INSTALLATION FOR FORMING HOLDERS FOR EGGS OR THE LIKE
Filed May 28, 1956 15 Sheets-Sheet 8
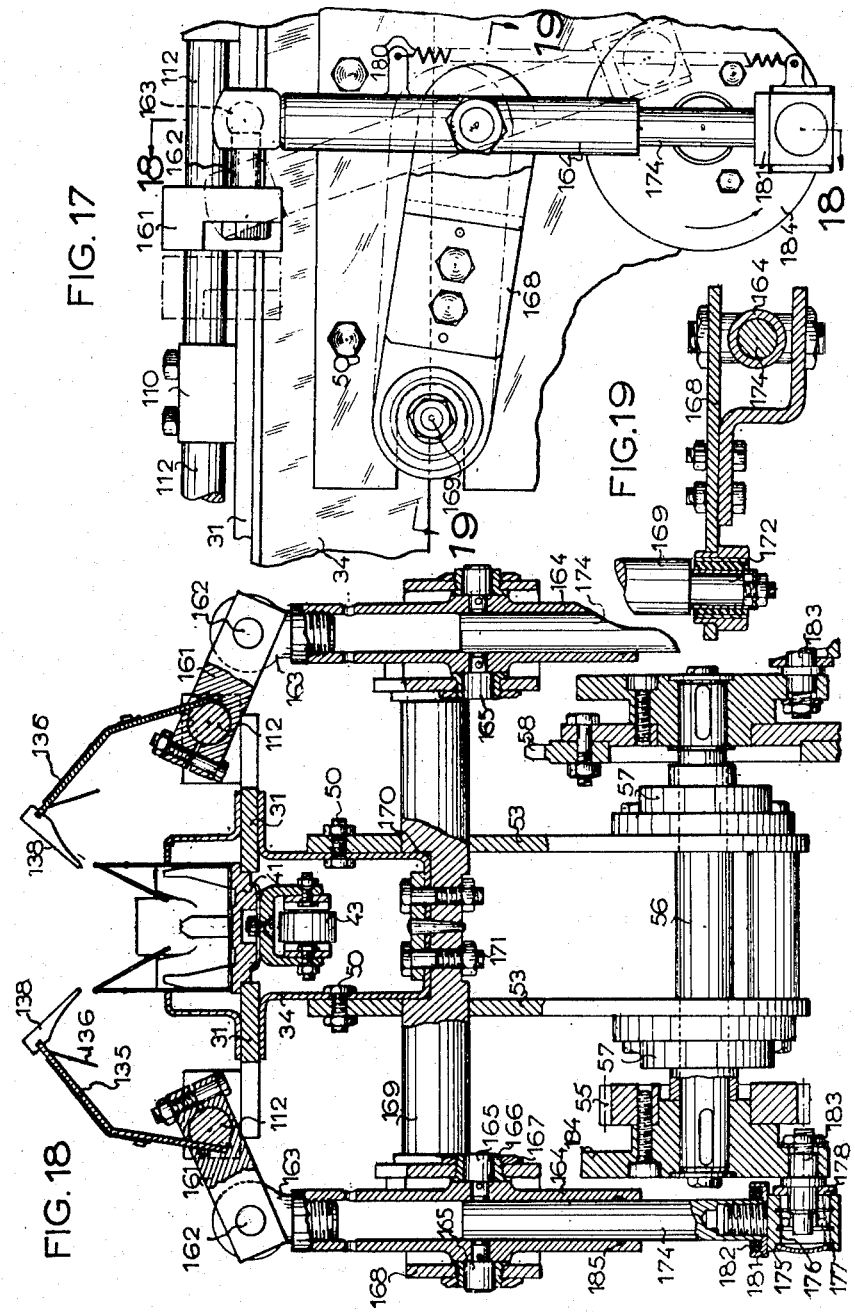
Inventor
C. Patin Aug. 27, 1957 C. PATIN 2,803,933
INSTALLATION FOR FORMING HOLDERS FOR EGGS OR THE LIKE
Filed May 28, 1956 15 Sheets-Sheet 12

Inventor
C. Patin
By Glascock Downing Seebold
Attys.

Aug. 27, 1957 C. PATIN 2,803,933
INSTALLATION FOR FORMING HOLDERS FOR EGGS OR THE LIKE
Filed May 28, 1956 15 Sheets-Sheet 13
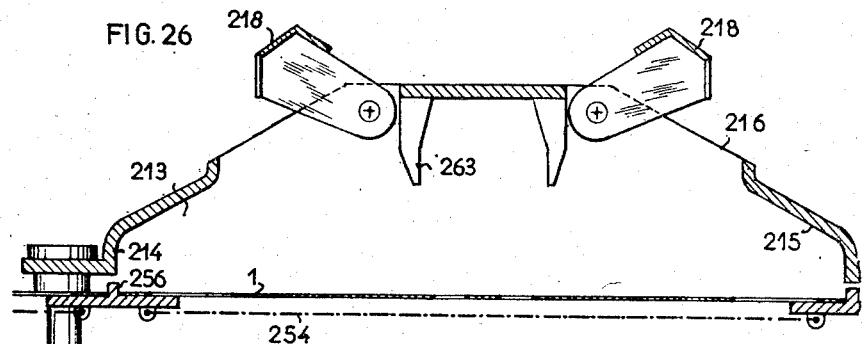
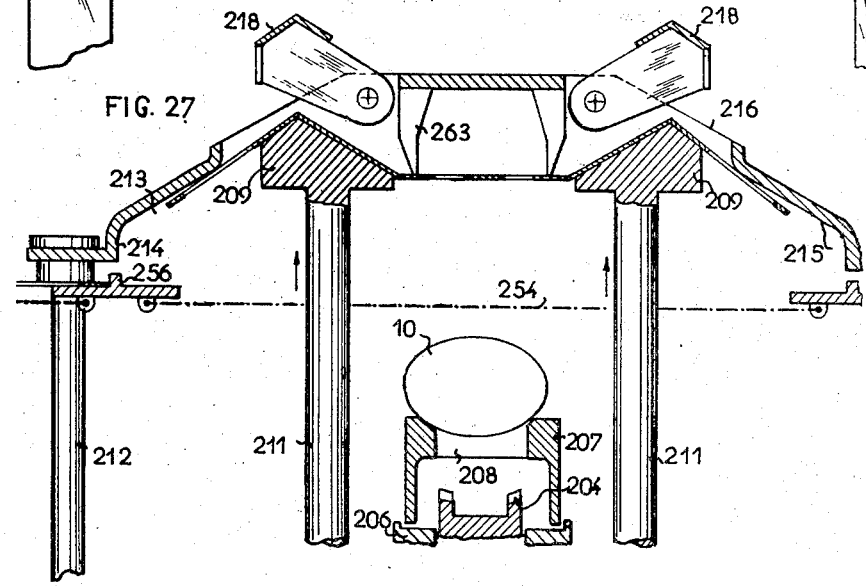

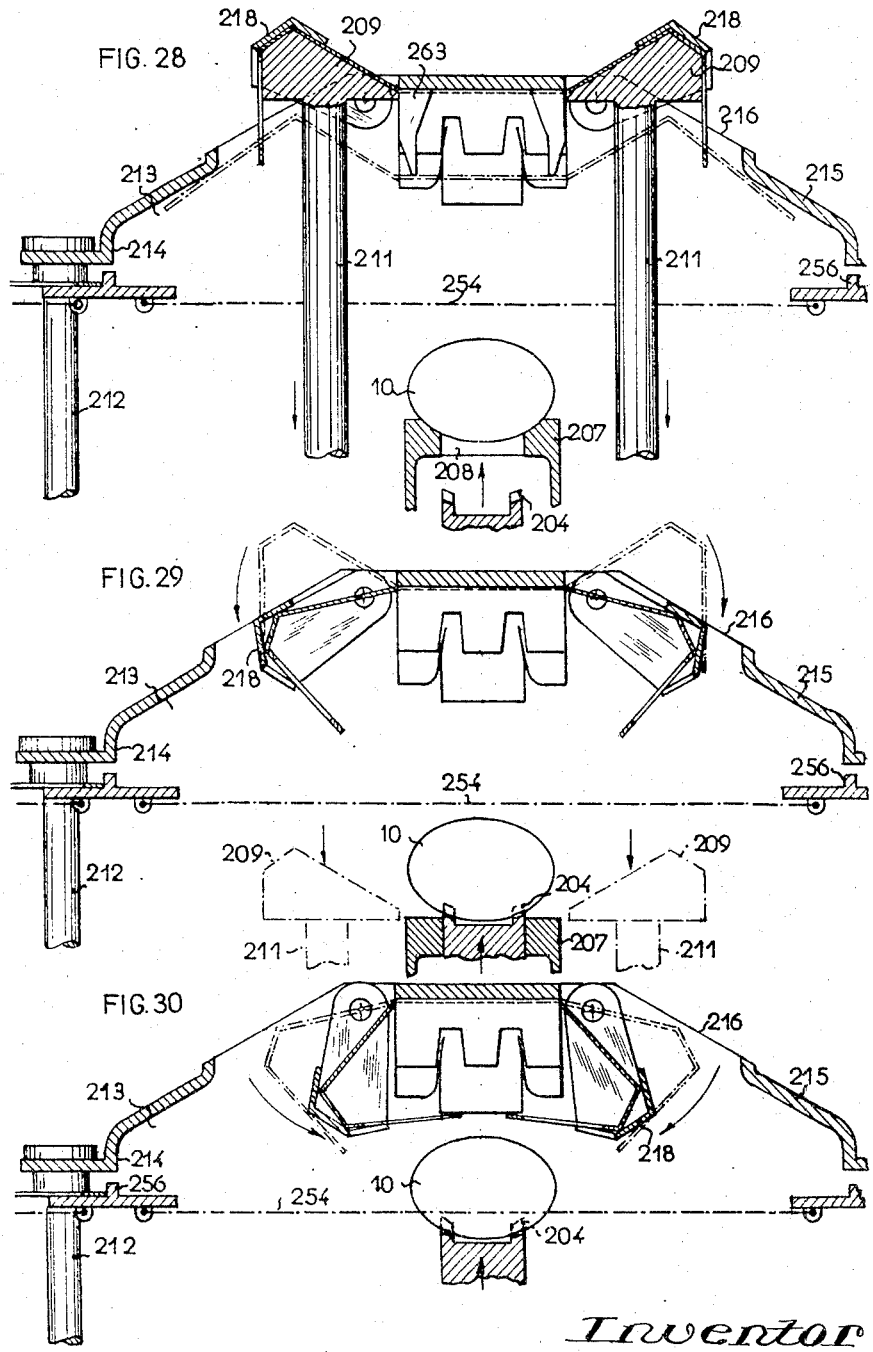

Aug. 27, 1957 C. PATIN 2,803,933
INSTALLATION FOR FORMING HOLDERS FOR EGGS OR THE LIKE
Filed May 28, 1956 15 Sheets-Sheet 15

Inventor
C. Patin

United States Patent Office 2,803,933
Patented Aug. 27, 1957

2,803,933

INSTALLATION FOR FORMING HOLDERS FOR EGGS OR THE LIKE

Claude Patin, Argenteuil, France, assignor to Société d'Application Technique d'Emballages Modernes (S. A. T. E. M.), Agadir, Morocco, a company of Morocco Application May 28, 1956, Serial No. 587,653

Claims priority, application France June 8, 1955

16 Claims. (Cl. 53—186)

The present invention relates to an installation for forming holders for eggs or the like, and, more particularly, for forming such holders obtained from a blank of cardboard or the like comprising cut out portions and fold lines, adapted to let a plurality of transverse partitions to be erected from the longitudinal central portion of the blank and outer longitudinal walls of the holder to be formed out of the lateral portions on either side of said central portion, the marginal strips of said lateral portions being adapted to form inner elements connected to the outer walls, said inner elements being apertured and spaced apart such a distance that the objects to be held in said holder may be engaged between said elements and retained in said apertures by their end portions.

According to the main feature of the invention, the installation comprises: first folding means adapted to erect the transverse partitions by folding same about transverse fold lines of the central portion of the blank adapted to form the base of the holder, second folding means adapted to fold the outer longitudinal walls of the holder about longitudinal fold lines of said central portion of the blank, third folding means adapted to fold each of the lateral portions on either side of the central portion, about at least one longitudinal fold line, said first, second, and third folding means being so arranged that the inner elements and the transverse partitions are brought edge on edge with predetermined points of said inner elements in coincidence with predetermined points of said transverse partitions, at least one point out of each pair of coinciding points being located at the entrance to an incision through the material, and means for driving home said inner elements relative to said transverse partitions.

The folding means may consist of guides in the shape of curved or helical surfaces between which the blanks are traversed and progressively set into finished holders.

The folding means may also consist of individual reciprocating or pivoting members adapted successively to act upon the blanks in successive stations through which the blanks are passed.

In other embodiments, the folding means may consist of reciprocating or pivoting members all arranged in a single station fed with blanks which then leave the station in the form of set holders. In this case, the various folding members operate preferably simultaneously or substantially so.

It should also be noted that the eggs themselves may be used as means for setting the holders in cooperation with other mechanical means.

Of course, in any given installation for forming such holders the folding means hereinabove set forth may be combined in any suitable and desirable manner.

Figure 2:
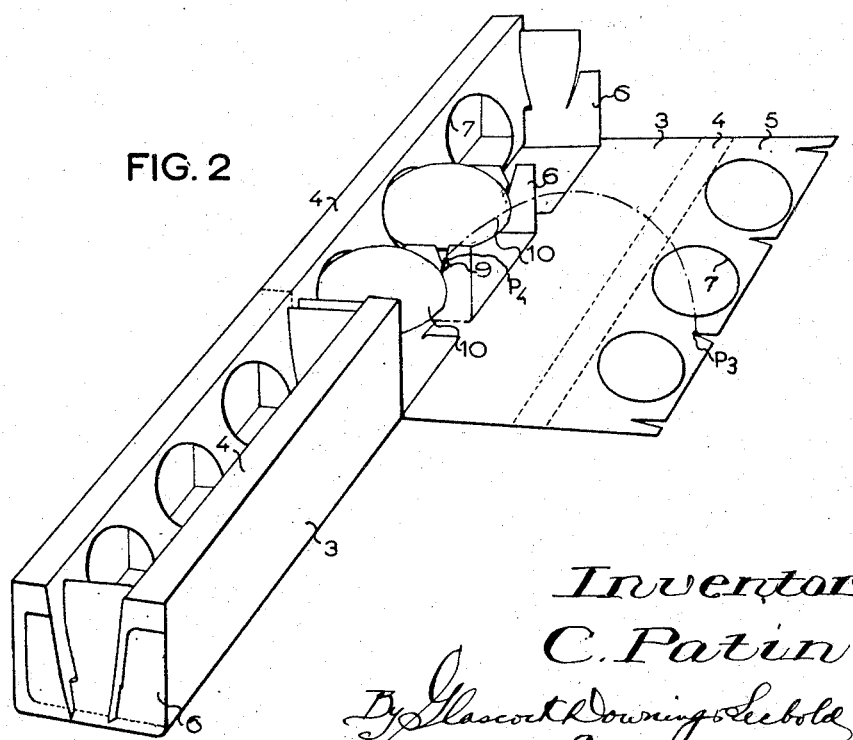
Figure 20:
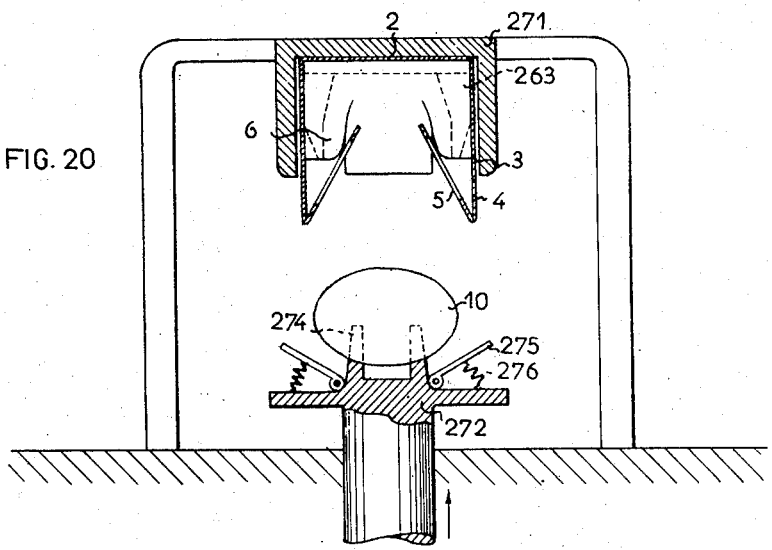
Figure 22:
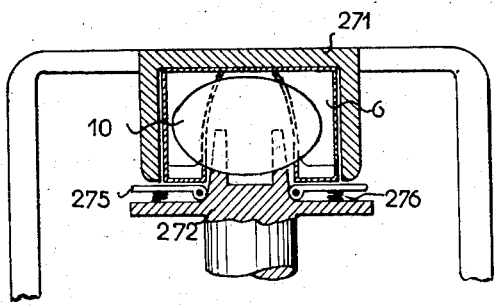
Figure 23:
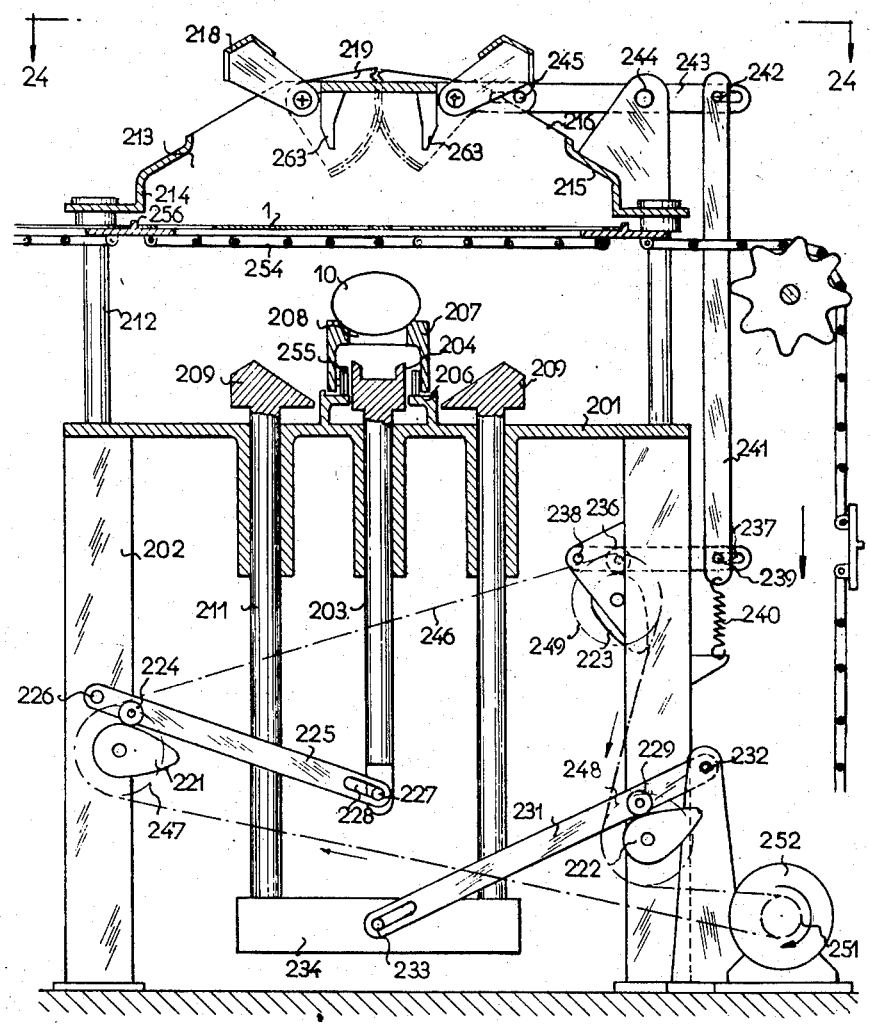
Figure 24:
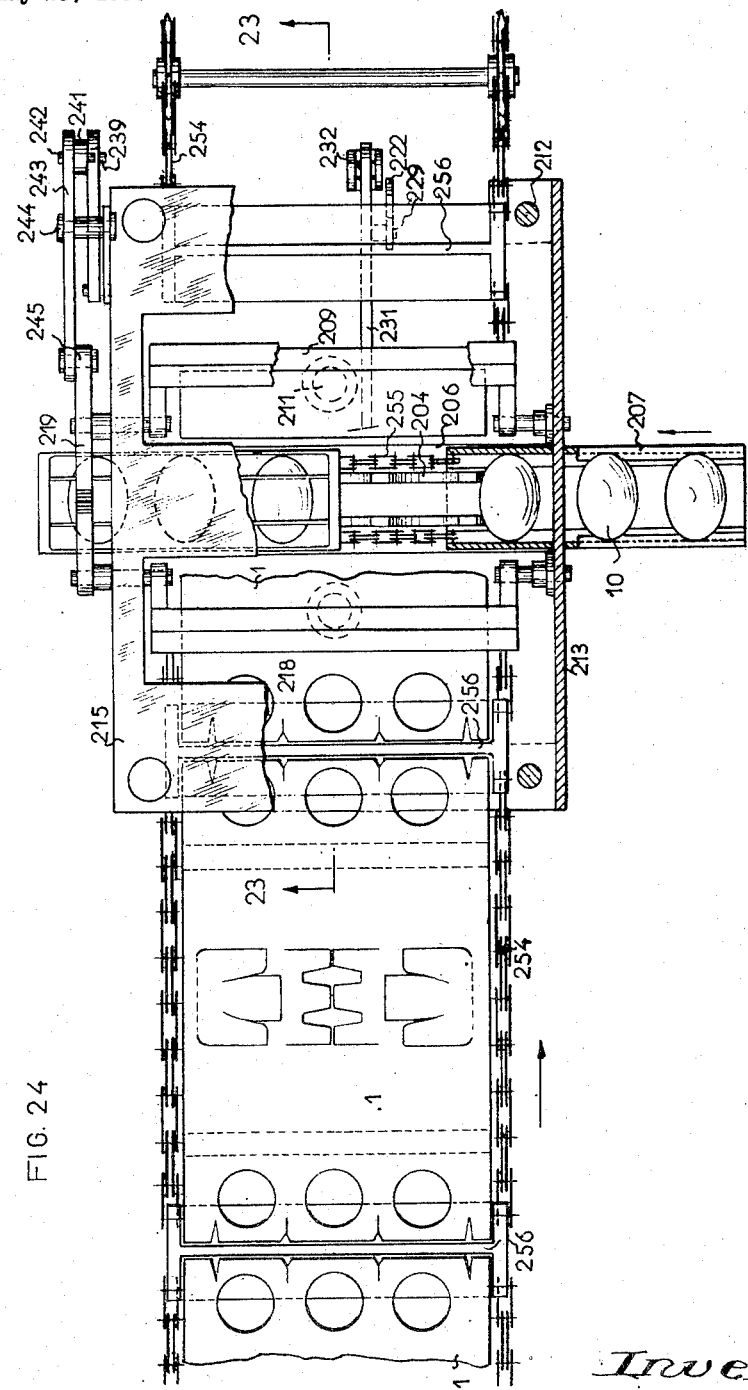
Figure 25:
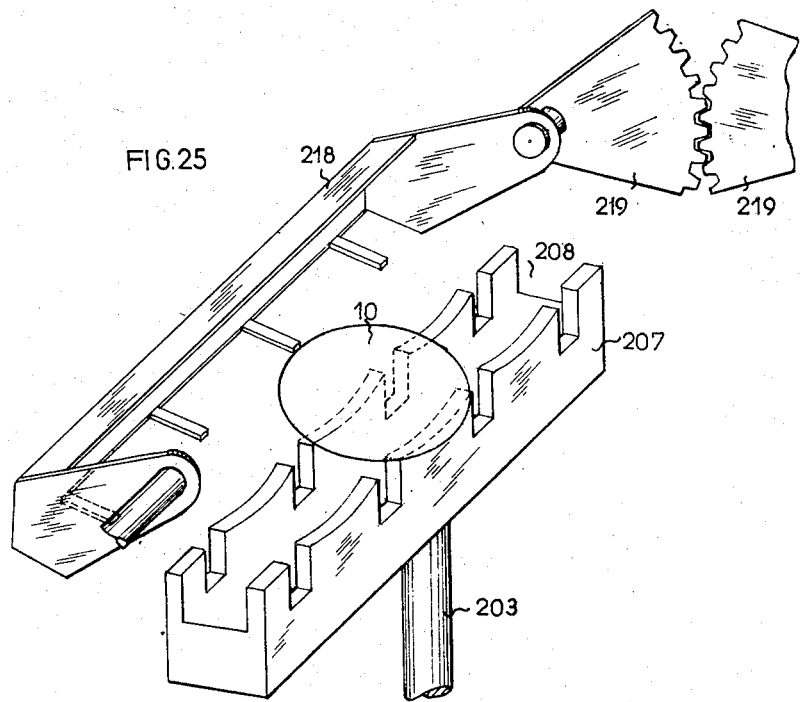
Figure 34:
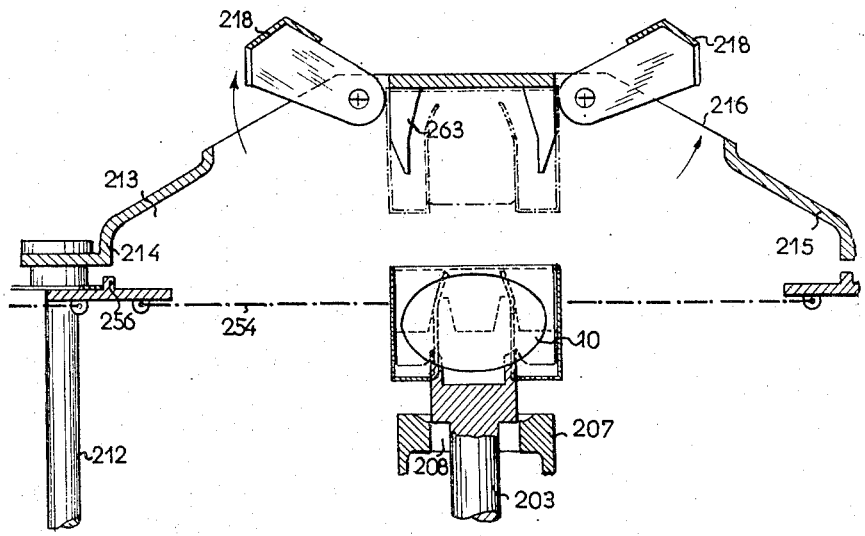

Further objects and advantages of the invention will be apparent to those skilled in the art, from a consideration of the following description of some specific embodiments of the invention shown by way of examples, in the accompanying drawings, in which:

Figure 1 shows a holder blank ready to be introduced into the setting machine,

Figure 2 is a perspective view of the holder obtained from the blank of Figure 1, the left-hand portion thereof being shown without eggs therein while the right-hand portion contains eggs, one face of this latter portion being unfolded down in order better to show the arrangement of the eggs in the finished holder, Figure 3 is a side elevational view of a first embodiment of a machine for setting the holder of Figures 1 and 2, Figure 4 is a corresponding plan view, Figure 5 is, on a larger scale, a sectional view taken on the line 5—5 of Figure 2, showing the details of the first station or station for positioning the blanks on sled lugs, Figure 6 is a section on line 6—6 of Figure 5, Figure 7 is a perspective view of the station for folding the inner walls of the holders, Figure 8 is an end view corresponding to Figure 7, Figure 9 shows, in perspective, the station in which the inner walls of the holders are brought nearer each other, Figure 10 is an end view corresponding to Figure 9, Figure 11 shows, in perspective, the station for setting the holders, Figure 12 is an end view corresponding to Figure 11, Figure 13 is a perspective view of a holder with eggs therein reaching the closing station, the members of this station being represented, on the right hand side portion of the figure, in the position they assume after the holder has been closed, and, on the left hand side portion, they are supposed to be raised in order clearly to show the configuration of the holder under closed condition, Figures 14a, 14b, 14c are end views corresponding to Figure 13 and illustrating the respective positions of the members in three different positions in the course of this operation, Figure 14d is a plan view of a detail of Figure 14a, on a larger scale, Figure 15 is an axial longitudinal section of the extracting and storing stations, taken substantially on the line 15—15 of Figure 16, Figure 16 is an end view of the storing station as seen in the direction of the arrow 16 of Figure 15, Figure 17 is a side elevational view of the mechanism for imparting a compound accompanying movement to the longitudinal rods which actuate the operating members of the various stations, Figure 18 is a section taken substantially on line 18—18 of Figure 17, Figure 19 is a fragmentary section taken on the line 19—19 of Figure 17, Figure 20 shows a modification of a portion of the machine represented in Figures 3 to 19, Figures 21 and 22 illustrate two steps in the operation of this modification, Figure 23 is an elevational view of another machine for setting holders of the type shown in Figures 1 and 2, Figure 24 is a corresponding plan view with portions thereof cut away, Figure 25 is a perspective view of a detail of the machine of Figures 23 and 24, and Figures 26 to 34 are diagrams showing the successive operational steps for setting a holder in the machine of Figures 23 to 25.

Referring first to Figure 1, 1 is a blank of cardboard or like material which will be formed and set into a holder adapted to receive eggs. The blank is rectangular and divided into seven rectangular adjacent strips by longitudinal fold lines extending parallel with two sides of said blank.

In order to facilitate the understanding of the description given hereinunder, a particular name has been given for identifying each of said blanks portions, namely: the base or bottom 2, both outer walls 3, both upper strips 4, and both inner elements 5 which constitute the seven aforesaid adjacent rectangular strips separated by fold lines. Transverse partitions 6, cut out in the base, are adapted to be folded at right angles to said base.

Figure 2 shows the holder under final condition, with a portion thereof unfolded in order better to show the manner in which the eggs are supported by their end portions in circular apertures of the inner elements of the holder. The assemblage is ensured by engaging edge on edge the inner elements 5 provided with notches 8 into corresponding incisions 9 of the transverse partitions 6.

It will be seen that setting the holders, therefore, consists from the cut out blank represented in Figure 1, infolding up the transverse partitions 6, lifting and folding down the inner elements 5 toward the middle of the holder by creasing the fold lines already marked which separate the seven aforesaid adjacent rectangular strips, in order to bring predetermined points, such as p1 and p3 (Figures 1 and 2), of the inner elements in coinciding relation with predetermined points, such as p2 and p4, of the transverse partitions, by engaging the inner elements edge on edge on the transverse partitions, then driving home the inner elements into the corresponding incisions 9 of the transverse partitions.

The machine represented as a whole on Figures 3 and 4 will now be fully described. This machine comprises a horizontal table constituted by two elongated plates 31 extending parallel with each other and spaced apart a predetermined distance. These plates are respectively secured to the outwardly bent marginal portions of the wings of a hollow U-shaped beam (Figure 18) formed by a folded iron sheet extending throughout the length of the machine. The U-shaped beam rests upon two plates 35, 36 (Figures 3 and 4) secured to the upper portion of four legs 37 adapted to rest upon the ground.

Along the inner edges of both plates 31 which constitute the machine table, are adapted to slide sleds 41 (see also Figure 5) provided with lugs or fingers 42 adapted to penetrate into the cut out portions of the cardboard blanks and the drive the holders formed from these blanks throughout the length of the machine in order to carry them through the various stations for preliminary setting, filling, and final setting which will be hereinafter called closing operation.

The sleds 41 are each secured to an individual link of an endless chain 43 near the rear end of the sleds with respect to their direction of progression, for reasons which will be given hereinunder.

The sleds 41 are all identical and mounted one behind another on the chain 43 and the upper run of this chain is suspended from the sleds which slide and rest upon the table 31. As a contrast, the sleds are suspended upside down from the lower run of the chain.

The chain 43 is supported at both ends of the machine by two sprocket wheels 44 and 45 respectively. The sprocket wheel 44 is keyed on a shaft 51 (Figures 15 and 16 on which the chain is not represented) which is journalled in two antifriction bearings (not represented) mounted on two plates 53 secured to the outer faces of the wings of the longitudinal U-beam 34 by means of bolts 50 (Figures 17 and 18). The shaft 51 (Figure 15) carries a toothed wheel 54 (represented in chain-dotted line) in mesh with a toothed pinion 55 (also represented in chain-dotted line) keyed on a shaft 56 which is journalled in two antifriction bearings 57 (see also Figure 18) also mounted on both plates 53. Also keyed on the shaft 56 is a sprocket-wheel 58 on which passes a chain 61 (Figure 3) adapted to be driven by a sprocket pinion 62 mounted on the output shaft of a speed reducer 63 the input shaft of which is operatively connected to the rotor of an electric motor 64. The electric motor 64 and its reducer 63 are mounted on a platform supported by the two adjacent legs of the machine.

Each sled 41 occupies a length nearly equal to that of four links of the chain 43 and, in the embodiment illustrated, the sprocket wheel 44 has eight teeth, so that, when this wheel effects one complete revolution, the chain moves a length equal to that of eight links, i. e. two sleds. The ratio of the toothed wheels 55 and 54 is equal to ½ in order that the input shaft rotates one complete revolution each time the chain progresses the length of one sled. It will be seen that it is the function of the shaft 56 to control the movements effected in every station of the machine.

At the other end of the machine, the chain 43 is supported by the sprocket wheel 45 (Figures 3 and 5). (In Figure 5, for the sake of clarity, the chain 43 has been represented only by the axes of articulation of its links.) The sprocket 45 is an idle wheel mounted on a shaft 67 both ends of which are supported by two plates 68 secured to the outer faces of the wings of the longitudinal beam 34.

Articulated on the shaft 67 (Figure 5) are two further plates 68 in the lower portion of which is journalled a shaft 71 on which are secured a sprocket wheel 72 and a cam 73. Over the sprocket 72 which also has eight teeth, passes the chain 43 so that said sprocket also rotates half a revolution each time the chain 43 progresses the length of one sled. The cam 73 rigid with this sprocket will serve for actuating the members of the first station station as will be seen hereinunder.

The sprocket 72 at the same time, also serves as an idler for keeping the chain 43 under taut condition and, for this purpose, an extensible connecting rod 74 (Figure 3) has been provided the lower end of which, inserted between both plates 68 is articulated to the latter, and the upper end is articulated to a bracing member 75 rigid with the longitudinal beam 34 of the machine.

The erection and setting of the holders is effected by means of a sequence of operations which take place in a number of stations which will be described hereinunder, more in detail, namely:

(a) A first station in which the flat blanks of cardboard are driven against the lugs of the sleds and the carrying walls or inner elements are being erected. This station generally indicated as at 81 in Figures 3 and 4, and represented in detail in Figures 5 and 6, is controlled by the cam 73 as will be seen hereinunder.

(b) A second station for folding the inner elements, indicated as at 82 and controlled, as well as all the following stations, by the shaft 56 by means of a special device to be described.

(c) A third station indicated as at 83, for bringing together the opposite inner elements.

(d) A fourth station 84 for setting the holders, (e) A fifth station 85 for filling up the holders, (f) A sixth station 86 for closing the holders, (g) A seventh station 87 for extracting the holders, and (h) An eighth station 88 or delivering station.

The first station 81 comprises two guides 91 (Figure 6) secured to the plates 68 and each of which comprises a bottom 92 having a width corresponding to the outer walls of the holders, added to the width of the upper strip, an inclined portion 93 adapted to ease erecting the inner walls of the holders, and a flange 94, the distance between the flanges of both guides being substantially equal to the total width of the initial blank of cardboard. These guides 91 have the same inclination as the run of chain 43 passing over both wheels 72 and 45 and they are substantially aligned with the adjacent edge of both plates 68 on which the sleds slide in the course of this portion of their path of travel.

The active member of the first station is a pressing member composed of two pieces of folded iron sheet 96 forming an angle bar two wings of which extend in a common plane upon which the blank will rest upon being fed into the machine. Both angle bars 96, provided with spacers 97, are carried by two arms 98 (see also Figure 1)

pivoted on a shaft 99 secured to both plates 68. One of these two arms carries a follower 102 which cooperates with the cam 73 and which, therefore, supports said arm.

The upper end of the pressing member 96 is shaped into a portion of a cylindrical surface coaxial with the shaft 99 on which the arms 98 are pivoted. An inclined chute 103 has its lower edge in close proximity to the end of the pressing member without engaging it so as to allow swinging movement of the latter. The diameter of the cam 73 and the general arrangement are such that, when the follower 102 rests upon the cylindrical portion of the cam, the plane of action of the pressing member is slightly elevated with respect to the level of the chute 103 as may be seen in Figure 5. The cam 73 has two diametrically opposed bosses 104 and two small matches 105 angularly shifted by the same angle with respect to said bosses. The arrangement is such that, at the moment a sled comes facing the pressing member, a notch 105 passes under the follower and makes the pressing member move down to or slightly below the level of the chute 103 in order to enable the blank which lies over it to descend onto the pressing member in abutting relation with a stop 101 rigid therewith. The next boss of the cam 73 then causes the pressing member to rise against the sled while accompanying the latter one moment in its travel by virtue of the geometry of the mechanism.

Each sled is provided, at the rear portion thereof with a tongue 106 (Figures 5 and 6) perpendicular to the base of the sled and which is adapted to accompany the holders during their whole travel within the machine.

Referring to Figures 7 and 8, description will now be given of the second station 82 or station for folding the inner elements or carrying walls of the holders. This station comprises, first, two angle-bars 111 one wing of which is secured horizontally flat against the corresponding plate 31 of the machine whereas the other wing serves for slightly raising and supporting the cardboard of the holders at the fold line which separates the outer wall from the upper strip.

On each side of the machine is a longitudinal rod 112 rotatably mounted in bearings 110 supported by the corresponding plate 31 and only two of which are represented on Figure 17. On each rod 112 is secured a flap 113 provided with prongs 114, and adapted to fold the inner element of the holders against the inner face of the outer wall. For this purpose, a movement is imparted to each of the rods 112 with not only a rotational component on its axis but also a longitudinal rectilinear component. Actually, it has been explained hereinabove, that the holders are driven by the chain in a continuous movement through the various stations of the machine. In order to avoid any distortion of the holders in longitudinal direction, such distortions being likely to hinder correct setting of the holders, the members of the various stations which contribute in folding the elements of the holders accompany the latter along a given length of their path of travel in the course of the work. It is for this purpose, that the rods 112 effect a complex accompanying movement having a rotational component for effecting the operation required and a rectilinear component comprising two steps namely a forward step during which they accompany the upper run of the chain by moving at the same speed as the chain and a return step during which they move in the reverse direction and at a slower speed, in order to reassume their original position as concerns both their location with respect to the table in longitudinal direction and their angular position.

It should be stated here that both rods 112 extend all over the length of the machine and are adapted to drive simultaneously all the working members of the various stations which successively act upon the holders as the latter are driven by the chain through these stations.

The compound movement hereinabove set forth is imparted to both rods 112 by means of a special device to be described hereinafter. The arrangement of the members of the second station is such that, when the flaps 113 have reached the end of their angular stroke, their edge is applied substantially against the upper edge of the stationary angle bars 111 in order to avoid any undesirable distortions of the cardboard.

Two stationary flanges 115 which laterally embrace the transverse partitions of the holders without interfering with the traversing movement of the latter serve the purpose of maintaining the holders properly set on the lugs of the sleds, by engagement of the horizontal lower edges of said flanges with the cardboard, even though the folding flaps 113 would tend to lift the blanks at the beginning of their action. The forward edge of the flanges 115 is inclined downwardly in the direction of progression of the sleds in order to force down to its correct place any blank slightly raised from the sole of the sleds at the exit from the first station 81. Both vertical flanges 115 are secured by screws 116 to the outer faces of the wings of a U-iron 117 the web of which is turned upwardly and which is supported, above the chain, by bracing members (not shown) which bear upon the plates 31 of the table without interfering with the traversing movement of the holders.

Figures 9 and 10 illustrate the third station 83 in which the inner walls of the holders are brought nearer each other. This station has no movable member, in contradistinction with the other stations; it only has two guiding angle bars 121 supported by rods 122 carried by a plate 123 itself secured flat against the web of the U-iron 117 of the station 82, which extends into the station 83 considered. The guides 121, as may be seen in the drawing, extend upwardly and nearer each other in the direction of progression of the holders so as to prepare the setting of the holders by acting upon the fold line between the inner walls of the holders and the upper strips thereof. The action of the various members of the machine will be explained in the general operation to be described.

It should be noted that this station has two longitudinal converging baffles 124 also secured to the wings of the U-iron 117. The longitudinal rods 112 extend along this station merely in order to reach the station 82 already described, but they are not utilized in station 83.

The fourth or setting station 84 is represented in detail in Figures 11 and 12 on which are shown two flaps 126 L-shaped in cross-section respectively carried by both longitudinal rods 112, two oblique longitudinal baffles 127 adapted to cooperate with the outer edge of the inner wall of the holders, and a maintaining template 128 supported by two leaf springs 129 secured to an extension of the plate 123 of station 83. The maintaining template 128 is provided with two prongs 121 adapted to maintain in vertical position the holder outer walls brought to this position by the flaps 126. At the exit from this station 84, prior to the moment when the outer walls of the holders leave the maintaining template 128, they are engaged between two guides 133 secured onto the table in order again to be maintained in vertical position and this time not by their upper edge, but near their lower portion, so that they may be moved slightly away from each other for introducing the eggs therebetween in the following station which is the filling-up station 85.

This station could comprise members for automatically placing the eggs into the holders. In the example illustrated, it has been assumed that the holders were filled up by hand, and the filling station is constituted merely by a relatively long portion of the table extending from the setting station 84 to the sixth or closing station 86. In front of this station, several attendants may stand in order to feed the chain at the desired rate. This station comprises only the guides 133 which originate at the setting station 84 as hereinabove stated.

The sixth or closing station 86 is represented in detail on Figures 13 and 14a, 14b, 14c. It comprises two flaps 135 respectively carried by the longitudinal rods 112, These flaps are provided, on one hand, with leafsprings 136 (see also Figure 14d) adapted to press against the upper strips of the holders through aperture 137 of these flaps and, on the other hand, hooks 138 the inner face of which is slightly concave and adapted to cooperate with the inner walls of the holders. The lower guides 139 extend also through this station.

The next station is the station 87 for extracting the holders. It comprises two rails inclined upwardly in the direction of progression of the holders and constituted by two flat members 141 (Figure 15) one end of which is level with both plates 31 on which the sleds are travelling. A table 142 forms an extension of both rails 141 which is slightly more inclined than the latter and which carries two lateral guides 143 (Figure 4).

Finally, the delivery station (Figures 15 and 16) comprises a push member 151 provided with a hooking finger 152 and which is actuated by the adjacent longitudinal rod 112 through the medium of a connecting rod 153 rigid with said rod and pivoted on the push member 151 by a pin 154. The push member 151, therefore, has a movement with a component in the direction of progression of the sleds and a component in a direction at right angles to the former for ejecting the holders laterally.

Description will now be given of the mechanism imparting both longitudinal rods 112 the compound accompanying movement hereinabove referred to. For this purpose, reference will be had particularly to Figures 17 and 18.

The mechanism is identical for both rods; it comprises a crank 161 fixed on the rod 112 and articulated by means of a pin 162 on the ball-joint head 163 of a tubular connecting rod 164. The connecting rod 164 is provided with two aligned transverse spigots 165 which are journalled respectively in two shouldered sleeves 166 externally screw-threaded and retained by nuts 167 in corresponding holes provided in both branches of an arm 168 (see also Figure 19) terminating in a clevis. The geometrical axis of the spigots 165 is substantially normal to the vertical middle plane of symmetry of the machine and the arm 168 is itself supported by a shaft 169 extending parallel with the axis of the spigots 165. The shaft 169 has a flat portion 170 applied against the lower face of the longitudinal beam 34. The shaft 169 is secured to the beam 34 by means of bolts 171. A rubber sleeve 172 inserted between the arm 168 and the shaft 169 affords some winding movement of the connecting rod 164 during the oscillation of the crank 161.

Mounted for sliding movement within the tubular connecting rod 164 is a plunger 174 the lower end of which is internally screw-threaded and receives a threaded shank of a head 175 having a transverse bore 176 which serves as a housing for the outer race of a self-aligning ball bearing 177 retained in place by means of two resilient rings or clips 178 according to well-known practice.

Between the head 175 and the lower end of the plunger 174 is clamped a cup 181 which contains an O-ring 182 of rubber or similar material. The dimensions of the members are such that, when the plunger 174 rises into the connecting rod 164, it is the O-ring that abuts against the lower end of the connecting rod, it is distorted while absorbing the impact and, when it completely fills up the square section of the recess in the cup 181, it affords the integral transmission of the plunger 174 into the connecting rod in order to overcome any friction between these two members.

The inner race of the ball bearing 177 is mounted on the outer end of a crank 183 carried by a plate 184 keyed on the shaft 56 (see also Figure 3) hereinabove referred to.

Another O-ring 185 arranged in the lower end of the connecting rod 164 retains the lubricating oil within said rod.

The location of this mechanism will be seen on Figure 3 which shows, among others, the shaft 56, the crank plate 184, the tubular rod 164, and the arm 168.

The operation of the machine which has just been described is as follows:

The electric motor 64 drives the pinion 62, the chain 61, the chain wheel 58 and the shaft 56, through the speed reducer 63. The shaft 56 drives, on one hand, the chain 43 which carries the sleds 41, through the gear pair 55, 54 and the main wheel 44, and, on the other hand, the longitudinal rods of the upper stations, through the crank plates 184, plungers 174, connecting rods 164 and cranks 161. Finally, the pressing member of the first station is actuated by the cam 173 fixed on the chain wheel 72 which is rotatably driven by the chain 43 itself.

First, explanation will be given of the manner in which the compound accompanying movement of the longitudinal rods 112 is obtained. In Figures 17 and 18, the connecting rods 164 are represented in their lowermost position limited by two stops (not shown) carried by the rods 112. As the crank plates 184 rotate, in a given period of this movement, the cranks 183 move upwardly and carry along the plungers 174. During this movement, the connecting rods are not lifted. Then, at a predetermined moment, the head 175 of the plungers engages (under the damping action of the rubber O-ring 182) the lower end of the connecting rods 164, the latter are then lifted and, through the medium of the cranks 161, they cause the longitudinal rods 112 to pivot on their axes by a corresponding angle. This pivoting movement of the rods contributes in actuating the members of the various upper stations, as will be seen hereinafter. The crank plates further rotate uniformly, the cranks 183 now move downwardly and carry the plungers with them, while the connecting rods fall down under the action of their own weight and that of the arms 168 as well as under the action of the springs 180. The longitudinal rods 112 again assume their original abutting position and the plungers move on downwardly.

In addition to the up-and-down movement, the tubular connecting rods 164 are subjected to an oscillating movement on the axis of their spigots 165 (see particularly Figures 17 and 18). In fact, during the upper half-revolution of the cranks 183, the latter move backward with respect to the direction of progression of the upper run of the sled-carrying chain 43, and, therefore, the head 163 of the tubular connecting rods move in the same direction as said run of the chain 43. During this step of the cycle, the longitudinal rods 112, therefore, move in the same direction as the sleds which travel under the table. The whole assembly is so designed that from the movement when the rods 112 rotate on their axes in the direction in which they bring the station members into cooperation with the holders carried by the sleds, until the moment when they rotate in the reverse direction for clearing said members, they accompany said sleds substantially at the same speed as the speed of the latter over the table, so that everything takes place as if the holders were left stationary for a while within stationary stations during each operation.

During the lower half-revolution of the cranks 183, the latter move in the reverse direction and, therefore, cause the longitudinal rods 112 to be driven backward with respect to the direction of progression of the sleds.

By virtue of the gear ratios and the numbers of teeth of the chain wheels selected, as hereinabove indicated, it will be understood that the longitudinal rods 112 and, therefore, the members carried by said rods, are capable of performing one operation upon a holder carried by a sled while they accompany the latter, then to move back to their original position in order to carry out the same operation upon the holder carried by the next sled, and so on.

The holders carried by the sleds are continuously driven through the various stations and are subjected therein to one operation of the cycle by the members of the stations which accompany them during a while on their way on the table.

Since the head 163 of the tubular connecting rods 164 travels over an arc of a circle the centre of which is located on the axis of the corresponding rod 112, it also moves with respect to the longitudinal plane of symmetry of the machine. The middle portion of these connecting rods which carries the spigots 165, therefore, also has a corresponding movement, however of a shorter amplitude. It is for permitting this movement that a rubber ring 172 is inserted between the arm 168 and the shaft 169.

The active movement of the rods 112 is a quick one whereas their return movement is slow as may be ascertained by considering the rotational directions and the arrangement of the connecting rods.

One complete cycle for preparing, filling up and setting the holders comprises the following sequence of operations:

*First operation—station 81—(Figures 3, 4, 5 and 6).*— A blank of cardboard 1 (such as indicated in Figure 1) is laid upon the chute 103 with its fold lines extending in longitudinal direction. This blank has its lower edge resting on the upper portion of the pressing member 96. At the moment when a recess 105 of the cam 73 reaches under the follower 102, the latter descends into this recess and carries the arms 98 with it. The pressing member slightly moves down and the blank placed in the chute 103 abruptly falls upon the pressing member 96 and moves down until its lower edge rests upon the stop 101. Upon the bump 104 of the cam 73 lifting the follower 102, the pressing member 96 drives the blank upon the lugs 42 of the sled 41 which is precisely positioned facing the pressing member at this moment of the cycle. In the course of this movement, which lasts but a little while, the pressing member accompanies the sled and, simultaneously, the inner walls of the holder are folded up, first by the inclined portions 93 of the guides 91, then by the straight portions which form extensions thereof. The cardboard now assumes the U-shape indicated as at 1' in Figure 6. The cam 73 goes on rotating and releases the arms 98 which let the pressing member 96 move down ready for receiving a further blank.

*Second operation—station 82—(Figures 3, 4, 7 and 8).*—The sled loaded with the blank received in station 81 is laid upon the inlet end of the machine table. The flaps 113 actuated by the longitudinal rods 112 are pivoted against the inner walls already bent 90° in station 81 but slightly moved outwardly owing to the resiliency of the cardboard and said inner walls are now applied against the outer walls of the holder, as indicated as at 5' on the drawing (Figure 8). Upon the flaps 113 being pivoted back upwardly, the inner walls again unfold outwardly to a certain extent due to their resiliency and assume the position indicated as at 5" on Figure 8. Since the fold lines already creased in the blank constitute regions of least resistance, which indeed is their purpose, care has been taken that, in the course of this folding operation of the inner walls 5, the edge of the flaps 113 at the end of their stroke comes into engagement with the fold line which separates the upper strip 4 from the outer wall 3 and which precisely is located on the upper edge of the angle guide 111. The prongs 114 of the flaps 113 slightly penetrate into the openings 7 of the inner walls and prevent the latter from escaping upwardly by sliding on the edge of the flaps 113 at the beginning of the movement. When they leave the second station 82, the inner walls of the holders, therefore, assume the position indicated as at 5" on Figure 8.

*Third operation—station 83—(Figures 3, 4, 9 and 10).*—This station alone has no movable members; while the holders are traversed between the inclined guides 121, the latter erect the outer walls 3 from the position represented in full lines as at 3 on Figure 10, and which is the same as that they assumed when leaving station 82, to the position represented in chain-dotted lines as at 3'.

*Fourth operation—station 84—(Figures 3, 4, 11 and 12).*—In this station is effected the setting of the holder. When leaving the preceding station, the holders assume the outline represented in full lines on Figure 12. The flaps 126 fold up the outer walls 3 to a greater extent and bring them to the vertical position represented in chain dotted lines as at 3' on Figure 12, after the templet 128 has been lifted, by the way, against the action of the leaf spring 129. It is in this step that the aforesaid predetermined points (such as p1 and p3, in Figure 1) of the inner elements 5 are brought edge on edge in coincidence with corresponding predetermined points (such as p2, p4) of the transverse partitions 6. The top of the upper strips 4, therefore, is entrapped between the prongs 131 of the templet 128, whereby the walls of the holder are unable to unfold outwardly. The flaps 126 rise and recede in order to act upon the next holder, while the holder which has just been set is traversed onward and engaged between the lateral guides 133 (Figure 11) prior to leaving the upper templet 128.

*Fifth operation—station 85—(Figures 3 and 4).*—While the holders are progressing through the filling station 85, they are held laterally by the lower guides 133 (Figure 11) which extend all over the length of this station. The outer walls of the holders therefore, are unable to fold down outwardly, however, since the guides 133 are rather low, the inner walls 5 of the holders may be moved apart to some extent so as to allow eggs to be introduced into the circular apertures 7 (see Figure 2) of said inner walls. The filling station 85 extends longitudinally over a length which is sufficient for affording several attendants to simultaneously fill-up a plurality of holders in order that the rapid rhythm of the machine may be maintained. This manual filling station could be replaced by an automatic one.

*Sixth operation—station 86—(Figures 3, 4, 13 and 14 a to c).*—When entering the closing station the flaps 135 of which are raised, the holders filled up with eggs are under the condition represented in Figure 14a. Upon the flaps 135 initiating their lowering movement, the springs 136 (Figure 14a) come into engagement with the fold lines which separate the inner walls 5 (Figure 1) from the upper strips 4 and they push these upper strips inwardly, but the latter are almost immediately retained by the inner face of the hooks 138. From this moment on, the upper strips 4 pivot on the fold line which separates them from the outer walls 3 whereas the inner walls 5 descend and are inserted into the notches of the erected transverse partitions. At a particular moment, the springs 136 bear flat against the upper strips 4 (Figure 14b) and therefore, are unable to move any further downwardly, the flaps 135, however, move on and fold said upper strips down to the horizontal until they bear flat against the latter (Figure 14c).

The concave face of the hooks 138 has an important role to play, for the following reason: the inner walls pushed downwardly tend to knick, and since they are already slightly curved, they could knick only on their convex side. However, they are perfectly maintained on this side by the concave faces of the hooks 138 and they are, therefore, quite rigid, thus avoiding any risk of knicking. The holders leave the station 86 under closed condition and have the aspect shown on Figure 13.

*Seventh operation—station 87—(Figures 3, 4, 15 and 16).*—The holders, now filled up with eggs and closed, still move on and slide on two inclined rails 141 which lift them progressively away from the sleds. They are still driven over some distance by the tongues 106 of the sleds. The holders are thus pushed over the table 142, while the sleds successively pass into the lower run of the chain 43.

At the beginning of the description, it has been said that the sleds are secured to the chain 43 near their rear end. The reason for this arrangement is to avoid any exaggerated rising movement of the rear of the sleds at the moment when they initiate their passing onto the lower run of the chain over the chain wheel 44.

*Eighth operation—station 88—(Figures 3, 4, 15 and 16)*.—The holders which rest on the table 142 are then taken by the finger 152 of the extractor 151 which accompanies them and then throws them laterally of the path of travel through the various stations of the machine. Each holder pushed aside by the extractor shifts the set of holders which have just been pushed individually.

It will be noted that the compound movement of the extractor also is obtained in a very simple manner by means of the connecting rod 153 which is rigid with the longitudinal rod 112 used for controlling all the stations.

Figure 21:
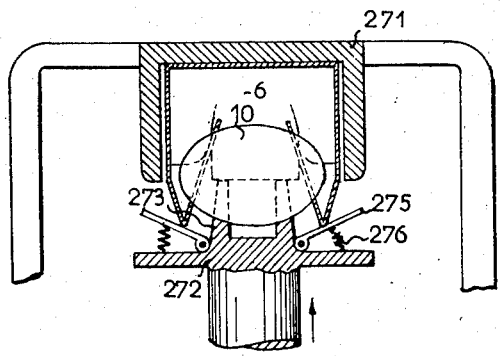

In Figures 20 to 22 a modification has been shown in connection with the last steps, namely the steps concerned with the introduction of the eggs into the holders and final setting of the holders. In this particular embodiment, the eggs themselves contribute in the final setting of the holders.

The holders are first prepared in the same manner as in the machine hereinabove described with reference to Figures 3 to 19, i. e. the transverse partitions 6 and the outer walls 3 are erected at right angles to the plane of the holder base and the inward folding operation of the inner elements is initiated as shown in Figure 20. The holders are held upside down by frictional engagement with a support 271 which may be, for instance, a sled of the lower run of the chain 43 of the machine hereinabove referred to.

Under the support 271 is a lifting plate 272 provided with two webs 273 formed with notches or recesses 274 facing each other pairwise and adapted to receive eggs 10.

The lifting plate 272 is carried by a member which accompanies the support 271 during a length of time which corresponds to the time necessary for introducing the eggs into the holders.

Pivoted on the lifting plate 272 are two flaps 275 urged upwardly by springs 276.

The operation of the device which has just been described is the following.

It being assumed that a holder 1 is already partially set and the lifting plate fitted with eggs, the lifting plate is raised and accompanies the support in horizontal direction while the eggs 10 are being engaged into the circular apertures 7 of the inner elements 5 which they drive upwardly and engage edge on edge into the incisions 9 of the inner elements 6.

Simultaneously, the upper strips 4 are pivoted on the fold line which separates them from the outer walls 3.

At a particular moment, the flaps 275 engage the fold line which separates the upper strips 4 from the inner elements 5 (Figure 16). From this moment on, they contribute in driving home the inner elements into the incisions of the transverse partitions. The springs 276 are crushed progressively and, upon the flaps 275 bearing flat against the upper strips 4 (Figure 17) the latter extend parallel with the holder base. The holder, now, is in the shape of a parallelepiped and the inner elements thereof assume their final position with the eggs held in place.

Of course, it could be assumed that the holders are not supported upside down as represented in Figure 15, but with their base resting on the support. Under these conditions, the lifting plate would be replaced by a member provided with means for holding the eggs, for instance in the form of vacuum cups, and which would drop the eggs into the holders, the relative motions of the parts remaining, however, unchanged.

Another machine for setting holders of the type shown in Figures 1 and 2 will now be described with reference to Figures 23 to 25 inclusive.

This machine comprises a table 201 supported by legs 202. In the central portion of the table 201 an egg elevating ram 203 is mounted for vertical reciprocating movement. Fixed on the upper end on the ram 203 is a rack 204 formed with arcuate portions 205 adapted to support eggs 10.

A track is formed by two rails 206 extending over the table 201 on either side of the rack 204 and parallel therewith. Carriages 207 are adapted to roll on said rails and to carry eggs 10 into the machine, they are driven by a chain 208 to which an intermittent movement is imparted. The carriages 207 are formed with a central aperture 208 through which the rack 204 may move up and down.

Two pusher members 209 are respectively rigid with the upper ends of two rods 211 adapted also to reciprocate vertically through the table 201.

Supported on four columns 212 resting upon the table 201 at the four corners thereof respectively is a forming support 213 of particular shape and constituting the setting station. The front and rear faces of said support extend vertically whereas the left and right-hand sides thereof are each formed with a short vertical portion 214, then with a portion 215 inclined upwardly and inwardly, and then an opening 216. The distance between the two vertical portions 214 is substantially equal to the length of the blank as considered in a direction at right angles to the fold lines.

Pivotally mounted in the front and rear walls of the forming support 213 as by means of stub shafts 217 are two flaps 218 each formed with three suitably angularly related faces. Two toothed segments 219 respectively rigid with each of the flaps 218 are in mesh so that their pivoting movements be synchronized.

The respective shapes and relative positions of the pusher members 209 and of the flaps 218 are such that, when the latter are in their uppermost position as shown in Figure 23, the pusher members 209 mate with the angular outline of the flaps 218 when they are moved upwardly.

The various movable members described so far are all actuated by rotary cams 221, 222, 223. The cam 221 cooperates with a follower 224 carried by a lever 225 one end of which is pivotally mounted as at 226 on the leg 202 and the other end operatively connected to the ram 203 as by means of a pin 227 engaged through a hole of said ram and through an elongated eye 228 of the lever 225.

The cam 222 similarly cooperates with a cam follower 229 carried by a lever 231 one end of which is pivoted as at 232 and the other end operatively connected by a pin 233 to a bracing member 234 rigidly secured to the lower ends of the rods 211.

The cam 223 also cooperates with a cam follower 236 carried by a lever 237 one end of which is pivoted as at 238 and the other end articulated by a pin 239 on the lower end of a lever 241. The upper end of the lever 241 is connected by a pin 242 with one end of a lever 243 fulcrummed as at 244 and the opposite end of which is connected to an extension of one of the toothed segments 214 as by means of a pin 245. A restoring spring 240 urges the lever 241 downwardly and, therefore, the flaps 218 upwardly.

All three cams 221, 222, 223 are rotatively driven in unison by means of a chain 246, passing over three chainwheels 247, 248, 249 respectively rigid with said cams and over a power chain wheel 251 adapted to be driven by an electric motor 252 through any suitable speed reducer.

The cardboard blanks are fed into the machine, one by one, by means of a double chain 254 moving in a direction at right angles to the direction of progression of a chain 255 which drives the egg-carrying carriages 207. At regular intervals, the chain 254 carries transverse tongues 256 adapted to support the blanks, the distance between two successive tongues being substantially equal to the length of the blanks. The space comprised between two successive tongues and the two runs of the chain 254 is completely cleared in order to enable the flaps 218 and rack 207 fitted with eggs passing therethrough.

Furthermore, in order that the flaps 218 and rack 204 do not interfere, the lower face of the flaps 218 is widely cut out so as to leave only finger-like portions 261 adapted to pass through corresponding notches 262 of the rack 204.

The forming support 213 is provided at the central top portion thereof with prongs or lugs 263 similar to the lugs 42 of the sleds 41 as described in the machine shown in Figures 3–19, and serving the same purpose, namely, erecting the transverse partitions of the holder.

Of course means, not shown, are provided for intermittently moving the blank feeding chain, 254, and the egg feeding chain 255, in proper sequence with the rotational movement of the aforesaid cams.

The operation of the machine which has just been described is the following:

It is assumed that the chain 254 has just brought a blank 1 into the setting station, and the chain 255, a carriage 207 fitted with eggs (Figure 26). The setting of the holder may be considered as divided into four steps, namely:

First step: both pusher members 209 lift the blank 1 and press it simultaneously against the support 213 and against the flaps 218 (Figure 27), thus effecting a first folding operation upon the blank, as represented in the drawing, while the blank is being brought against the support 213, its transverse partitions are erected normally to the base of the holder by the fingers 263. At the conclusion of this step, the inner elements of the holder are slightly folded inwardly by the flaps 218 and extend parallel with each other, as indicated in Figure 28. While the push members 209 recede downwardly, the holder is maintained in suspended position by frictional engagement with the fingers 263.

Second step: the flaps 218 start pivoting downwardly and fold inwardly the outer walls, the upper strips and the inner elements as a whole (Figure 29) while the rack 204 starts its upward movement. At the conclusion of this step, the various members respectively assume the positions represented in Figure 30, the inner elements of the holder being nearly adjacent each other in the middle longitudinal plane of symmetry of the holder.

Figure 31:
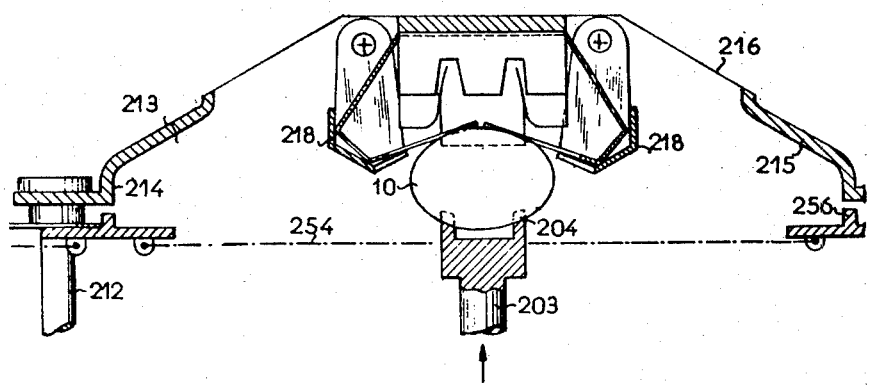
Figure 32:
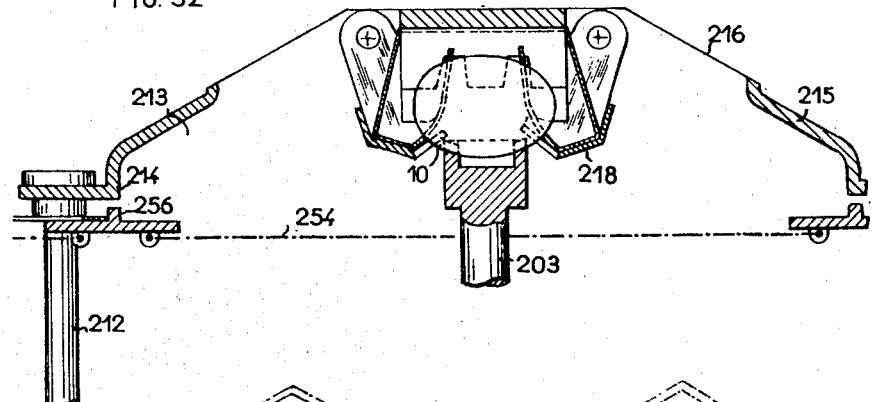
Figure 33:
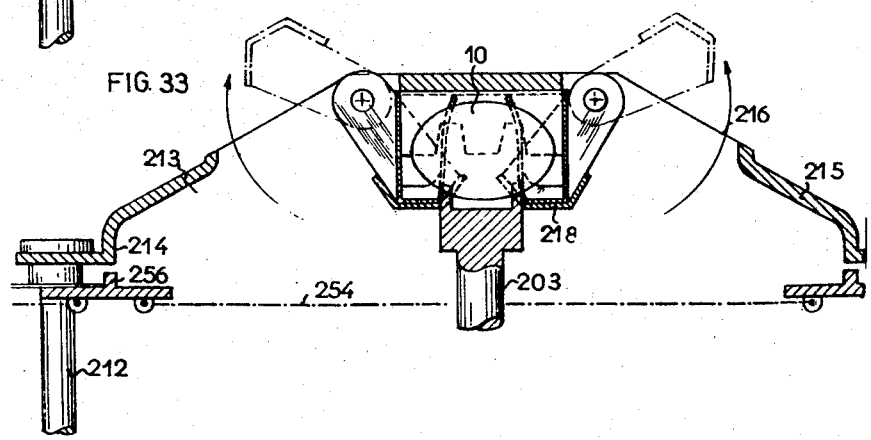

Third step: the rack 204 keeps lifting the eggs and the latter engage the inner elements of the holder (Figure 31). The tips of the eggs start entering the circular apertures of these elements. It is at this moment that the inner elements are brought edge on edge against the transverse partitions of the holder. With predetermined points, such as $p3$ (Figure 2) of the inner elements, in coincidence with predetermined points of the transverse partitions, such as $p4$, as already explained hereinabove. The movement is carried on and Figure 32 shows an intermediate position of the various members, in which the flaps 218, now, bear flat against the upper strips of the holders. Upon the members reaching the positions represented in Figure 33, the setting of the holder is completed, its outer walls are perpendicular to the base, its upper strips parallel with the latter and the inner elements assume their final position with the eggs in place.

Fourth step: in this step, the holders are cleared out of the machine. The holder now completely folded to final state is no longer frictionally engaged with the support 213, it is retained merely by the eggs themselves which rest upon the rack 204 and by the flaps 218. The latter, then, are pivoted upwardly and reassume their original uppermost position, the rack 204 sinks, the holder fitted with eggs is dropped upon the carriage 207 (Figure 34), the chain 255 progresses and drives the carriage which carries the holder fitted with eggs out of the setting station and brings thereinto a further carriage previously laden with eggs. In the meantime, the chain 254 has fed a new cardboard blank into the setting station.

No indication has been given as to the manner in which the blanks are dropped upon the chain 254, nor in what manner the eggs are placed upon the carriages 207 prior to their entering the machine; these operations may be carried out by hand or by means of any suitable automatic feeding device.

Of course, the blanks and the eggs could be introduced into the machine in many different manners. Thus, in the embodiment described, they are introduced in two right-angled directions and the eggs come out under packed condition through the side of the machine opposite that through which they were introduced, whereas the cardboard blanks come out through an adjacent face.

As many changes could be made in the above construction, and many widely different embodiments of this invention could be made without departing from the scope of the claims, it is intended that all matter contained in the above description or shown in the accompanying drawings shall be interpreted as illustrative and not in a limiting sense.

What I claim is:

1. An installation for forming holders from a blank of cardboard or the like comprising cut out portions and fold lines adapted to let a plurality of transverse partitions to be erected from the longitudinal central portion of the blank and outer longitudinal walls of the holder to be formed out of the lateral portions on either side of said central portion, the marginal strips of said lateral portions being adapted to form inner elements connected to the outer walls, said inner elements being apertured and spaced apart such a distance that the objects to be held in said holder may be engaged between said elements and retained in said apertures by their end portions, said installation comprising: first folding means adapted to erect the transverse partitions by folding same about transverse fold lines of the central portion of the blank adapted to form the base of the holder, second folding means adapted to fold the outer longitudinal walls of the holder about longitudinal fold lines of said central portion of the blank, third folding means adapted to fold each of the lateral portions on either side of the central portion, about at least one longitudinal fold line, said first, second, and third folding means being so arranged that the inner elements and the transverse partitions are brought edge on edge with predetermined points of said inner elements in coincidence with predetermined points of said transverse partitions, at least one point out of each pair of coinciding points being located at the entrance to an incision through the material, and means for driving home said inner elements relative to said transverse partitions.

2. An installation for forming holders from a blank of cardboard or the like comprising cut out portions and fold lines adapted to let a plurality of transverse partitions to be erected from the longitudinal central portion of the blank and outer longitudinal walls of the holder to be formed out of the lateral portions on either side of said central portion and at right angles thereto, the marginal strips of said lateral portions being adapted to form inner elements each connected to the corresponding outer wall by an upper strip to extend in a plane parallel with the plane of said central portion, said inner elements being apertured and spaced such a distance that the objects to be held in said holder may be engaged between said elements and retained in said apertures by their end portions, said installation comprising: first folding means adapted to erect the transverse partitions by folding same about transverse fold lines of the central portion of the blank adapted to form the base of the holder, second folding means adapted to fold the outer longitudinal walls of the holder about longitudinal fold lines of said central portion of the blank, third folding means adapted to fold each of the lateral portions on either side of the central portion, about at least one longitudinal fold line, fourth folding means adapted to fold said upper strips into parallel relationship with said central portion about a longitudinal fold line between said upper strips and said outer longitudinal walls, said first, second, third, and fourth folding means being so arranged that the inner elements and the transverse partitions are brought edge on edge with predetermined points of said inner elements in coincidence with predetermined points of said transverse partitions, at least one point out of each pair of coinciding points being located at the entrance to an incision through the material, and means for driving home said inner elements relative to said transverse partitions.

3. An installation according to claim 2, wherein said first folding means comprise lugs against which the blank is pressed endwise of said lugs for erecting said transverse partitions.

4. An installation according to claim 2, wherein at least one of said second, third, and fourth folding means include means for moving the blanks in a predetermined path of travel, said blanks being positioned with their longitudinal fold lines parallel with the direction of said path of travel, and stationary guide means suitably inclined to said direction so as progressively to fold the corresponding parts of the blanks.

5. An installation according to claim 2, wherein at least one of said second, third, and fourth folding means include pivoting folding members arranged on either side of a blank with their pivoting axes parallel with the longitudinal fold lines of the blank and adapted to engage the corresponding parts of the blank to be folded.

6. An installation according to claim 2, wherein said fourth folding means include pivoting folding members arranged on either side of a blank with their pivoting axes parallel with the longitudinal fold lines of the blank and adapted to engage the corresponding upper strip to be folded, said pivoting members being provided with fingers having inwardly curved faces against which the inner elements of the holder are adapted to bear for resisting the knicking stresses created by said pivoting folding members.

7. An installation according to claim 2, wherein said means for driving home said inner elements relative to said transverse partitions include an egg-supporting member adapted to be moved toward and away from the holder in a direction normal to the base of the holder and so position with respect to said holder that when said egg-supporting member fitted with eggs is moved toward the holder, both ends of the eggs engage the edges of the corresponding apertures of the inner elements of the holder, whereby said inner elements are driven home relative to said transverse partitions.

8. An installation according to claim 2, wherein said means for driving home said inner elements relative to said transverse partitions include an egg-supporting member adapted to be moved toward and away from the holder in a direction normal to the base of the holder and so positioned with respect to said holder that when said egg-supporting member fitted with eggs is moved toward the holder, both ends of the eggs engaged the edges of the corresponding apertures of the inner elements of the holder, whereby said inner elements are driven home relative to said transverse partitions, the installation further comprising a pair of flaps pivoted on said egg supporting member and resiliently urged relative to said egg-supporting member in a direction toward the respective upper strips of the holder, in order to press said upper strips to final position.

9. An automatic machine for forming holders from a blank of cardboard or the like comprising cutout portions and fold lines adapted to let a plurality of transverse partitions to be erected from the longitudinal central portion of the blank and outer longitudinal walls of the holder of the formed out of the lateral portions on either side of said central portion and at right angles thereto, the marginal strips of said lateral portions being adapted to form inner elements each connected to the corresponding outer wall by an upper strip to extend in a plane parallel with the plane of said central portion, said inner elements being apertured and spaced apart such a distance that the objects to be held in said holder may be engaged between said elements and retained in said apertures by their end portions, said machine comprising in combination: a frame, an endless chain-like driving member extending horizontally with one run above the other, a plurality of sleds secured to the outer face of said chain-like member and adapted each to receive one blank, a track extending parallel with the upper run of said chain-like member and adapted accurately to support and guide said sleds for movement of said sleds on said track, one control rod longitudinally arranged on each side of said chain-like member and mounted on said frame for combined reciprocating pivoting and reciprocating sliding movement, folding elements carried by said control rods and adapted to engage a blank carried by said sleds under pivoting movement of said rods, means for driving said chain-like member in a continuous movement, means for imparting to said control rods, on one hand, a reciprocatory longitudinal sliding movement at a speed substantially equal to that of said chain-like member when said rods are sliding in the same direction as said chain-like member and, on the other hand, a reciprocatory pivoting movement so timed with respect to said to-and-fro movement that said folding elements are in engagement with said blanks when they are moving longitudinally in the same direction as said chain like member and that they are pivoted away from said blanks when moving back in the reverse direction.

10. A machine as defined in claim 9, wherein said sleds are provided with positioning lugs adapted to extend through the apertures formed by the cuts which determine the transverse partitions of the holders, said lugs serving both for erecting the transverse partitions of a blank laid upon a sled and for retaining said blank on the sled during its whole travel through the machine.

11. A machine as defined in claim 9, wherein said sleds are provided with prositioning lugs adapted to extend through the apertures formed by the cuts which determine the transverse partitions of the holders, and wherein a pressing member is mounted on said frame for movement toward and away from each sled as the sleds successively pass said pressing member, whereby a blank laid on said pressing member is pressed against a sled and positioned on said positioning lugs which, at the same time, erect the transverse partitions.

12. A machine according to claim 9, wherein said folding elements are distributed over a portion of said track in several stations adapted to perform successive operations on the blanks carried by said sleds as the latter pass said stations respectively.

13. A machine according to claim 9, with folding members positioned above the path of travel of said sleds and also carried by said control rods, said folding members being provided with fingers having inwardly curved faces against with the inner elements of the holder are adapted to bear for resisting the knicking stresses created by said folding members.

14. An automatic machine for forming holders from a blank of cardboard or the like comprising cut out portions and fold lines adapted to let a plurality of transverse partitions to be erected from the longitudinal central portion of the blank and outer longitudinal walls of the holder to be formed out of the lateral portions on either side of said central portion, the marginal strips of said lateral portions being adapted to form inner elements connected to the outer walls, said inner elements being apertured and spaced apart such a distance that the object to be held in said holder may be engaged between said elements and retained in said apertures by their end portions, said machine comprising in combination: a frame with a setting station, blank supporting means in said setting station, egg-supporting means in said setting station adapted to be relatively moved toward and away from said blank supporting means, first folding means adapted to erect the transverse partitions and including lugs fixedly positioned in said setting station and pusher means adapted to push a blank towards and against said lugs endwise of said lugs for erecting the transverse partitions, first folding flaps pivotally mounted in said setting station and adapted to fold the outer longitudinal walls of the holder about longitudinal fold lines of the central portion of the blank, second folding flaps rigid with said flaps and angularly positioned with respect thereto adapted to fold each of the lateral portions of the blank on either side of the central portion thereof about at least one longitudinal fold line of the blank, said first folding means, first folding flaps and second folding flaps, being so arranged that the inner elements and the transverse parititions are brought edge on edge with predetermined points of said inner elements in coincidence with predetermined points of said transverse partitions, at least one point out of each pair of coinciding points being located at the entrance to an incision through the blank, said egg-supporting means being so positioned with respect to said blank supporting means that, when said egg-supporting means is moved toward said blank supporting means, both ends of the eggs engage the edges of the corresponding apertures of the inner elements of the holder, whereby said inner elements are driven home relative to said transverse partitions.

15. An automatic machine according to claim 14, wherein means are provided for feeding blanks to said blank-supporting means, and means for feeding eggs to said egg-supporting means.

16. An automatic machine according to claim 14, wherein said blank supporting means are in the shape of a frame through which said egg-supporting means and said pusher members may travel.

No references cited.